(12) United States Patent
Cooley

(10) Patent No.: US 9,781,019 B1
(45) Date of Patent: Oct. 3, 2017

(54) SYSTEMS AND METHODS FOR MANAGING NETWORK COMMUNICATION

(71) Applicant: Symantec Corporation, Mountain View, CA (US)

(72) Inventor: Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 528 days.

(21) Appl. No.: 13/967,963

(22) Filed: Aug. 15, 2013

(51) Int. Cl.
*G06F 15/173* (2006.01)
*H04L 12/26* (2006.01)

(52) U.S. Cl.
CPC .................................. *H04L 43/04* (2013.01)

(58) Field of Classification Search
CPC ...... G06F 21/56; H04L 63/1425; H04L 43/04
USPC ................................ 709/224, 223; 726/3, 23
See application file for complete search history.

(56) References Cited

U.S. PATENT DOCUMENTS

| | | | |
|---|---|---|---|
| 2002/0091819 A1* | 7/2002 | Melchione | H04L 12/24 709/224 |
| 2003/0172145 A1* | 9/2003 | Nguyen | G06Q 10/10 709/223 |
| 2003/0204632 A1* | 10/2003 | Willebeek-LeMair | H04L 29/06 709/249 |
| 2004/0128355 A1* | 7/2004 | Chao | H04L 63/14 709/206 |
| 2010/0169484 A1* | 7/2010 | Okamoto | G06F 21/54 709/225 |
| 2011/0060845 A1* | 3/2011 | Jungck | H04L 29/12028 709/245 |

* cited by examiner

*Primary Examiner* — Joon H Hwang
*Assistant Examiner* — Sherman Lin
(74) *Attorney, Agent, or Firm* — FisherBroyles LLP

(57) ABSTRACT

A computer-implemented method for managing network communication may include (1) identifying a pattern of network communication between a network node and a network service, (2) creating a representation of the network communication pattern, (3) querying, using the representation of the communication pattern, a network communication pattern database that associates network communication patterns with computer programs responsible for generating the patterns, (4) receiving, in response to querying the database, identification of a computer program associated with the network communication pattern, and then, (5) applying a network communication management policy assigned to the computer program associated with the pattern to network communication between the network node and network service. Various other methods, systems, and computer-readable media are also disclosed.

20 Claims, 7 Drawing Sheets

| Destination Address | Destination Hostname | Port Number | Source Program | Policy |
|---|---|---|---|---|
| | liveupdate.symantec.com | | Symantec LiveUpdate | Terminate Security Analysis |
| | | TCP/UDP 6881-6887 | BitTorrent Client/Server | Filter Program Traffic |
| | solfire.aljosaborkovic.com kukutrustnet777.info l33t.brand-clothes.net maellisromance.com | | Palevo/Sality Virus | Disable Network Access |
| | radio.irib.ir | TCP 135 | Possible Botnet | Initiate Security Analysis |
| 133.98.8.120 | | | Possible DDoS | Initiate Security Analysis |

Pattern Record 502
Pattern Record 504
Pattern Record 506
Pattern Record 508
Pattern Record 510

SYSTEMS AND METHODS FOR MANAGING NETWORK COMMUNICATION

BACKGROUND

Network devices, such as gateways, often provide various centralized management and security services that operate on network traffic originating from a large number of network nodes. These services may provide a number of benefits, including potentially avoiding the need to individually manage each node within a network.

The risk arises, however, that services operating on a node may be duplicated on a gateway, resulting in an unnecessary degradation of network performance. For example, a gateway is an advantageous location for malware detection or website filtering services for network traffic served by the gateway. However, if malware detection or parental control software is installed on a network node, redundant services on a gateway or other network device may result in decreased network performance without a coinciding increase in network security or utility. Network services located on a gateway or other network device also often lack useful mechanisms for alerting end users about network management and/or security issues, such as network policy violations.

In view of the above limitations, the instant disclosure identifies a need for additional and improved systems and methods for managing network communication.

SUMMARY

As will be described in greater detail below, the instant disclosure generally relates to systems and methods for managing network communication by identifying computer programs running on network nodes based on patterns of network communication originating from the nodes. In one example, a computer-implemented method for managing network communication may include (1) identifying a pattern of network communication between a network node and a network service, (2) creating a representation of the network communication pattern, (3) querying, using the representation of the communication pattern, a network communication pattern database that associates network communication patterns with computer programs responsible for generating the patterns, (4) receiving, in response to querying the database, identification of a computer program associated with the network communication pattern, and then, (5) applying a network communication management policy assigned to the computer program associated with the pattern to network communication between the network node and network service.

In one example, identifying the pattern of network communication may include identifying a destination network address or hostname for the network service that the network node communicates with. Identifying the pattern of network communication may also include parsing a uniform resource identifier (URI) for the network service that the network node communicates with.

In some examples, the representation of the network communication pattern may include a destination network address, hostname, port number, or URI for the network service that the network node communicates with. The representation of the network communication pattern may also include URI components, such as a URI scheme name, URI query, or URI fragment.

In some examples, applying a network communication management policy may include initiating or terminating a security analysis of network traffic associated with the network node, initiating or terminating website filtering of network traffic associated with the node, or enabling or disabling network access for the node. Applying a network communication management policy may also include initiating or terminating filtering of network communication between the node and a network service, or initiating or terminating filtering of network communication associated with the computer program associated with the communication pattern.

In some examples, the network communication management policy may be obtained by reading the policy from a configuration file. In other examples, the network communication management policy may be obtained from the network communication pattern database. The policy may also be selected by a user via a user interface.

In some examples, the computing device that performs at least a portion of the computer-implemented method may include a gateway, router, routing switch, integrated access device, or cache server.

In one embodiment, the computer-implemented method may also include maintaining the network communication pattern database by (1) installing the computer program, (2) monitoring network traffic originating from the computer program, and (3) adding the network communication pattern associated with the computer program to the network communication pattern database. The computer-implemented method may also include maintaining the network communication pattern database by (1) deploying a software agent that locates, downloads, and installs the computer program, (2) monitoring network traffic originating from the computer program, and (3) adding the network communication pattern associated with the computer program to the network communication pattern database. The computer-implemented method may also include maintaining the network communication pattern database by (1) providing a monitoring module to network nodes that monitors traffic originating from the computer program, (2) receiving, from the monitoring module, the network communication pattern associated with the computer program, and (3) adding the network communication pattern associated with the computer program to the network communication pattern database.

In one embodiment, a system for implementing the above-described method may include an identification module that identifies a pattern of network communication between a network node and a network service. The system may also include a pattern representation module that creates a representation of the network communication pattern. The system may additionally include a query module that queries, using the representation of the network communication pattern, a network communication pattern database that associates network communication patterns with computer programs responsible for generating the network communication patterns. The query module may also receive, in response to querying the network communication pattern database, identification of a computer program associated with the network communication pattern. The system may also include a policy application module that applies a network communication management policy assigned to a computer program associated with the network communication pattern to network communication between the network node and a network service. The system may also include one or more processors that execute the identification module, the pattern representation module, the query module, and the policy application module.

In some examples, the above-described method may be encoded as computer-readable instructions on a computerreadable-storage medium. For example, a computer-readable-storage medium may include one or more computer-executable instructions that, when executed by at least one processor of a computing device, may cause the computing device to (1) identify a pattern of network communication between a network node and a network service, (2) create a representation of the network communication pattern, (3) query, using the representation of the network communication pattern, a network communication pattern database that associates network communication patterns with computer programs responsible for generating the patterns, (4) receive, in response to querying the network communication pattern database, identification of a computer program associated with the network communication pattern, and then (5) apply a network communication management policy assigned to the computer program associated with the network communication pattern to communication between the node and a network service.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is a block diagram of exemplary network communication pattern database records.

Figure 1:
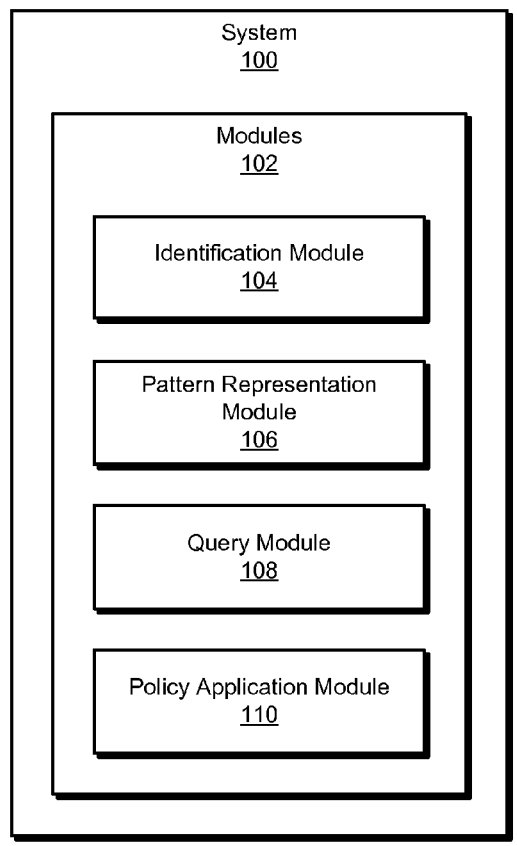
FIG. 1 is a block diagram of an exemplary system for managing network communication.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for managing network communication. As will be explained in greater detail below, by identifying programs running on network nodes, the systems and methods described herein may enable services operating on a gateway or other network device to apply network management policies appropriate to the security or utility needs of the network node, but without the loss of performance that would result from performing redundant services. As a result, less expensive network devices may be able to more closely match the performance of more expensive devices while providing similar levels of security and utility.

The following will provide, with reference to FIGS. 1-2, 4, and 5, detailed descriptions of exemplary systems for managing network communication. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for managing network communication. As illustrated in this figure, exemplary system 100 may include one or more modules 102 for performing one or more tasks. For example, and as will be explained in greater detail below, exemplary system 100 may include an identification module 104 that identifies a pattern of network communication between a network node and a network service. Exemplary system 100 may also include a pattern representation module 106 that creates a representation of the network communication pattern.

In addition, and as will be described in greater detail below, exemplary system 100 may include a query module 108 that queries, using the representation of the network communication pattern, a network communication pattern database that associates network communication patterns with computer programs responsible for generating the network communication patterns. Query module 108 may also receive, in response to querying the network communication pattern database, identification of at least one computer program associated with the network communication pattern. Exemplary system 100 may also include a policy application module 110 that applies a network communication management policy assigned to the computer program associated with the network communication pattern to network communication between the network node and at least one network service. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
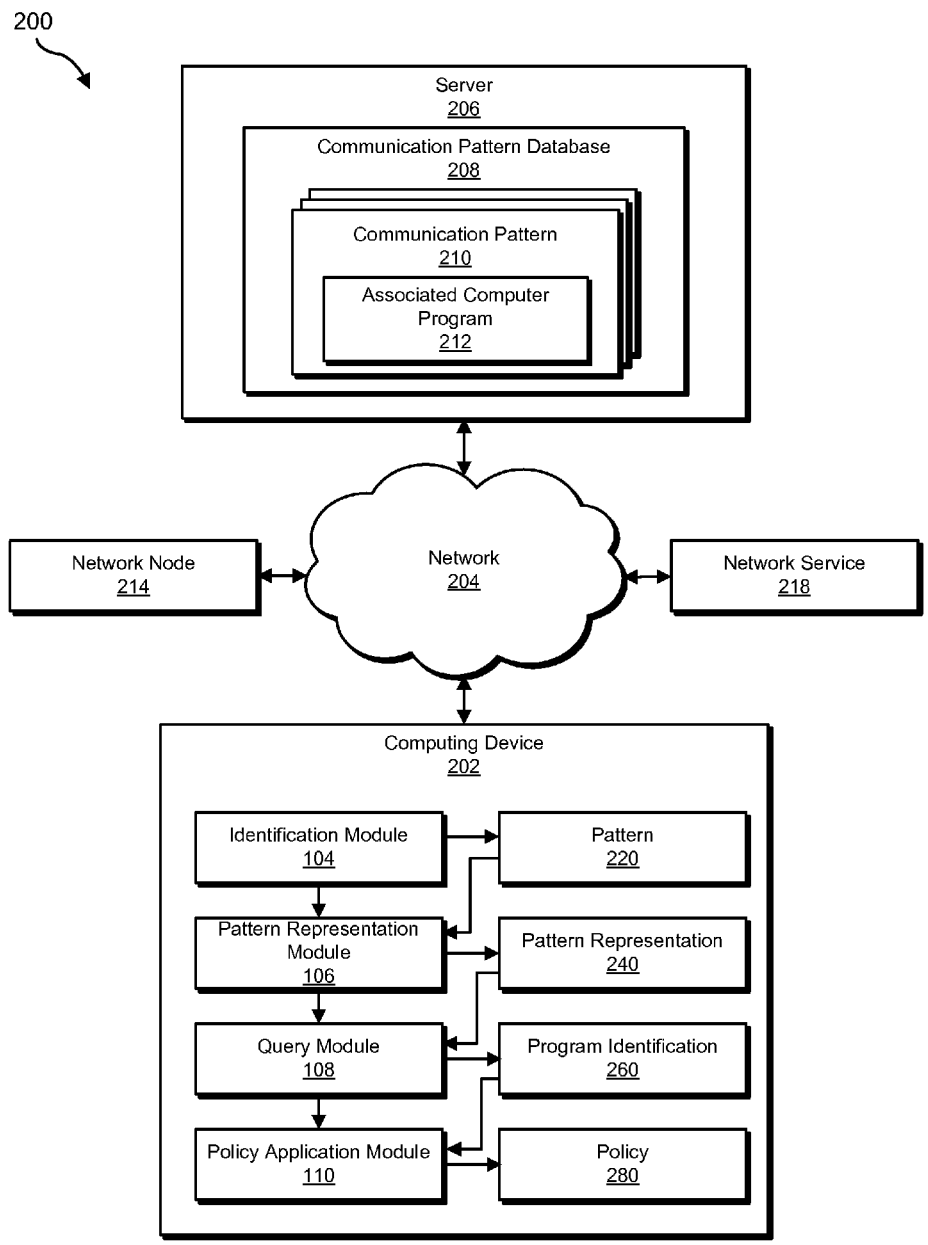
FIG. 2 is a block diagram of an exemplary system for managing network communication.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Computing device 202 may be programmed with one or more of modules 102. Additionally or alternatively, server 206 may be programmed with one or more of modules 102.

In one embodiment, one or more of modules 102 from FIG. 1 may, when executed by at least one processor of computing device 202 and/or server 206, facilitate computing device 202 and/or server 206 in managing network communication. For example, and as will be described in greater detail below, one or more of modules 102 may cause computing device 202 and/or server 206 to (1) identify a pattern of network communication between a network node (e.g., network node 214) and at least one network service (e.g., network service 218), (2) create a representation of the network communication pattern (e.g., pattern representation 240), (3) query, using the representation of the network communication pattern, a network communication pattern database (e.g., communication pattern database 208) that associates network communication patterns with computer programs responsible for generating the network communication patterns, (4) receive, in response to querying the network communication pattern database, identification of at least one computer program associated with the network communication pattern (e.g., associated computer program 212), and (5) apply a network communication management policy (e.g., policy 280) assigned to the computer program associated with the network communication pattern to network communication between the network node and at least one network service. One or more of modules 102 may also cause computing device 202 and/or server 206 to obtain the network management policy and maintain the network communication pattern database.

Computing device 202 generally represents any type or form of computing device capable of identifying and/or analyzing network communication between network nodes and network services. Examples of computing device 202 include, without limitation, gateways, routers, routing switches, integrated access devices, cache servers, combinations of one or more of the same, exemplary computing system 610 in FIG. 6, or any other suitable computing device. In some examples, all network traffic may be routed through computing device 202, which may be positioned between network node 214 and network service 218. For example, computing device 202 may represent a gateway between a corporate network and the Internet, or between customers of an Internet service provider (ISP) and the Internet.

Server 206 generally represents any type or form of computing device that is capable of storing, comparing, and/or providing data. Examples of server 206 include, without limitation, application servers and database servers configured to provide various database services and/or run certain software applications. For example, server 206 may represent a database server configured to provide network communication pattern data to computing device 202. In some examples, communication pattern database 208 may be stored locally on computing device 202, rather than remotely on server 206.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
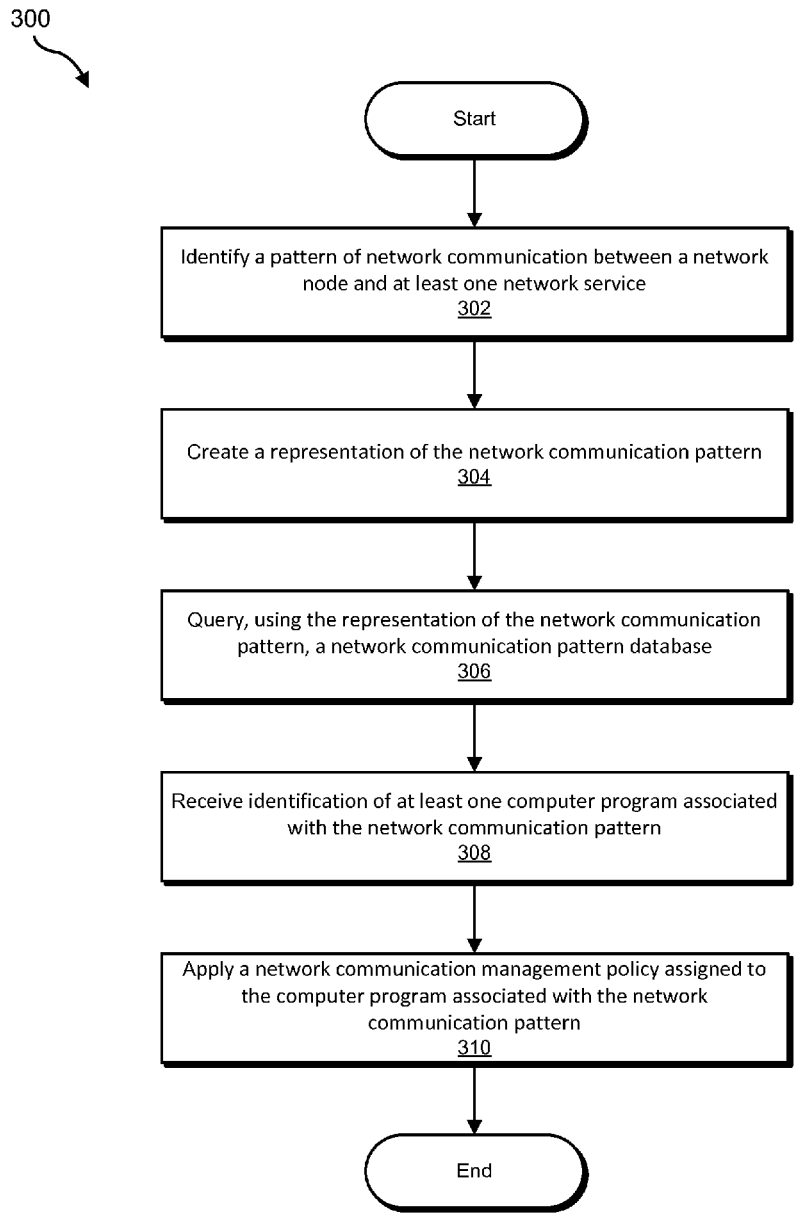
FIG. 3 is a flow diagram of an exemplary method for managing network communication.

FIG. 3 is a flow diagram of an exemplary computer-implemented method 300 for managing network communication. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a pattern of network communication between a network node and at least one network service. For example, at step 302 identification module 104 may, as part of computing device 202 in FIG. 2, identify a pattern 220 of network communication between network node 214 and network service 218.

As used herein, the term "pattern of network communication" generally refers to any type or form of information that may be used to characterize network communications associated with a computer program running on a network node that is communicating with one or more network services. Examples of such information include, without limitation, destination network addresses or hostnames for network services that network nodes communicate with, URIs for network services that network nodes communicate with, URI components, such as URI scheme names, URI queries, or URI fragments, and/or other factors, such as the timing or periodicity of network communications and/or the quantity of data sent or received.

The systems described herein may perform step 302 in a variety of ways based on the types of communication between network node 210 and network service 218. In one example, identification module 104 may identify a destination network address for a network service 218 with which network node 214 is communicating. Identification module 104 may obtain this destination network address in a variety of ways, including from packet headers originating from network node 214. Identification module 104 may also obtain a network address of network node 214 from packet headers. In another example, identification module 104 may identify a destination hostname for a network service with which network node 214 is communicating. Identification module 104 may obtain this destination hostname in a variety of ways, including from a domain name system (DNS) request from network node 214 to resolve a URI to a network address.

In another example, identification module 104 may parse a URI for a network service with which network node 214 is communicating. Parsing this URI may yield information about the communication between network node 214 and network service 218, such as the URI scheme, which may indicate the communication protocol (such as hypertext transport protocol—HTTP or file transport protocol—FTP) in use between network node 214 and network service 218, the hostname of network service 218, or a port number used in communication between network node 214 and network service 218. Identification module 104 may identify a pattern of network communication between a network node and a network service using any combination of factors described above, or any other suitable factor, such as the timing or periodicity of network communication, or the quantity of data sent or received.

Returning to FIG. 3, at step 304 one or more of the systems described herein may create a representation of the network communication pattern. Using FIG. 2 as an example, pattern representation module 106 may, as part of computing device 202, organize pattern 220 identified by identification module 104 into pattern representation 240. As detailed above, pattern representation 240 may, for example, include fields found in communication pattern 210 records in communication pattern database 208.

The systems described herein may create pattern representations in a variety of manners using any combination of data items suitable for identifying a computer program running on a network node communicating with a network service. For example, pattern representation module 106 may create a pattern representation that includes fields identifying the network service 218 with which network node 214 is communicating, such as a destination network address or hostname. In another example, pattern representation module 106 may create a pattern representation that includes fields identifying the type of communication taking place between network node 214 and network service 218, such as the URI scheme, port number, URI query, or URI fragment. An FTP URI scheme, for example, may indicate that a network node is retrieving a file using file transport protocol. In addition, a port number of 118, for example, may indicate a network node is querying a database using structured query language (SQL). A URI query may specify data or the format for data a network node is requesting from a network service.

Returning to FIG. 3, at step 306 one or more of the systems described herein may query, using the representation of the network communication pattern, a network communication pattern database that associates network communication patterns with computer programs responsible for generating the network communication patterns. Using FIG. 2 as an example, query module 108 may, as part of computing device 202, query communication pattern database 208 using pattern representation 240 generated by pattern representation module 106.

The systems described herein may query the network communication pattern database in a variety of ways. In one example, query module 108 may query communication pattern database 208 using pattern representation 240 to identify a computer program running on network node 214 that generated the communication pattern. In other examples, multiple queries may be used to identify a category of computer programs to which the computer program generating the communication pattern belongs. In such examples, communication pattern database 208 may be structured to indicate that a network communication management policy is associated with a category of computer programs, or that another query should be made to identify the computer program within the category.

Figure 4:
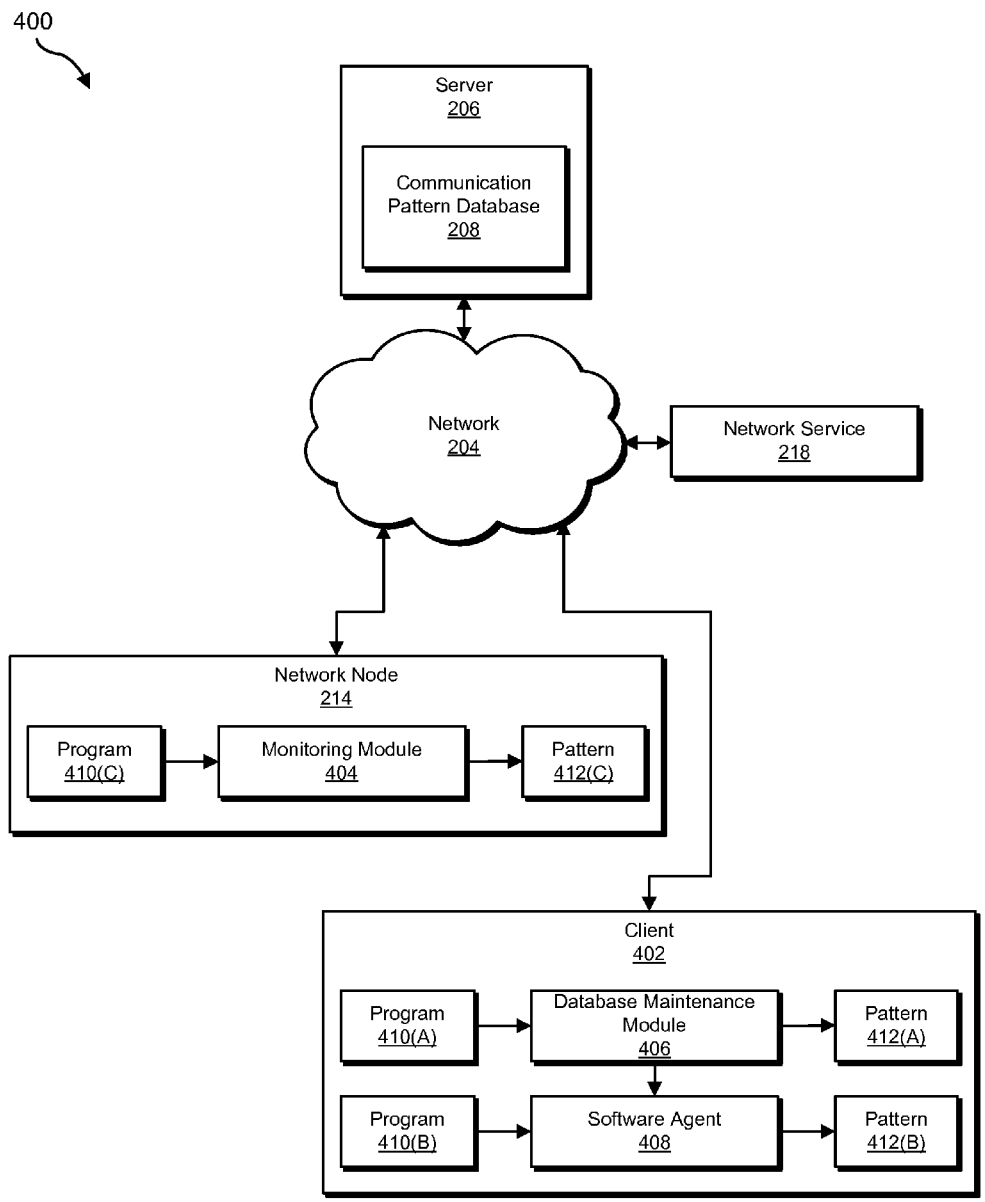
FIG. 4 is a block diagram of an exemplary system for managing network communication.

The systems described herein may create and/or maintain communication pattern database 208 in a variety of ways. FIG. 4 is a block diagram of an exemplary system 400 capable of performing such a task. As shown in FIG. 4, exemplary system 400 may include a client 402 as well as components of exemplary network communication management system 200; namely, network 204, server 206, network node 214, and network service 218. Exemplary system 400 may also include various components capable of monitoring network communication of computer programs 410 to obtain network communication patterns 412.

In one example, database maintenance module 406 may create and/or maintain communication pattern database 208 by installing a computer program to be evaluated (e.g., program 410(A)) on client 402, monitoring network traffic originating from the computer program, and then adding a network communication pattern associated with the computer program (e.g., pattern 412(A)) to network communication pattern database 208. In another example, database maintenance module 406 may deploy a software agent 408 to client devices (e.g., client 402) within a community that locates, downloads, and installs computer programs (e.g., program 410(B)), monitors network traffic originating from these computer programs, and adds network communication patterns associated with these computer program (e.g., pattern 412(B)) to network communication pattern database 208.

In another example, the systems described herein may create and/or maintain communication pattern database 208 by including a monitoring module 404 on a network node (e.g., network node 214) that monitors network communication associated with one or more computer programs running on the network node and adds a network communication pattern associated with these computer programs to network communication pattern database 208.

FIG. 5 is a block diagram of exemplary network communication pattern records 500 that may be included in a network communication pattern database. As depicted in FIG. 5, network communication pattern records may include a destination address, a destination hostname, a port number, and/or a source computer program associated with a network communication pattern, and/or a network communication management policy to be applied to network communication associated with the source computer program, as explained in greater detail below. Other fields may be included in the database as needed to efficiently or uniquely identify network communication patterns associated with source computer programs.

Returning to FIG. 3, at step 308 one or more of the systems described herein may receive, in response to querying the network communication pattern database, identification of at least one computer program associated with the network communication pattern. Using FIG. 2 as an example, query module 108 may, as part of computing device 202, receive program identification 260 from communication pattern database 208 in response to querying communication pattern database 208 with pattern representation 240 generated by pattern representation module 106.

The systems described herein may perform step 308 in a variety of ways. In one example, query module 108 may receive identification of a single program associated with pattern representation 240. In another example, query module 108 may receive identification of multiple programs that match pattern representation 240. In such examples, query module 108 may indicate that identification module 104 should acquire additional data to obtain a more precise match to a communication pattern associated with a computer program. In other examples, query module 108 may receive a category of computer programs. In such examples, communication pattern database 208 may be structured to indicate that a network communication management policy is associated with the category, or that additional data or additional queries may be required to identify a matching pattern representation.

Returning to FIG. 3, at step 310 one or more of the systems described herein may apply a network communication management policy assigned to the computer program associated with the network communication pattern to network communication between the network node and at least one network service. Using FIG. 2 as an example, policy application module 110 may apply policy 280 to network communication between network node 214 and network service 218.

As used herein, the term "network communication management policy" generally refers to any set of rules that may be associated with a computer program that may be applied to network nodes running the computer program. This set of rules may, for example, govern network communication between the computer program and one or more network services, or all network communication between the network node and network services. A network communication management policy may also be associated with a category of computer programs. Examples of the types of actions that such network communication management policies may specify, include, without limitation, initiating or terminating security analysis of network traffic associated with a network node, initiating or terminating website filtering of network traffic associated with a network node, enabling or disabling network access for a network node, initiating or terminating filtering of network communication between a node and a network service, and/or initiating or terminating filtering of network communication associated with a computer program. For example, a network communication management policy may specify that malware or other scanning should not be performed on traffic destined for network nodes with similar capabilities, additional scanning should be performed on network nodes lacking up-to-date security programs, website filtering should not be performed on traffic destined for network nodes with parental controls or similar capabilities, and/or network access for network nodes running banned software or malware should be disabled.

The systems described herein may identify or obtain a network communication management policy to apply in a variety of ways. For example, policy application module 110 may obtain a network communication management policy by reading the policy from a configuration file, by receiving a user-generated selection of the policy via a user interface, and/or by obtaining the policy from network communication pattern database 208. Obtaining the network communication management policy from a configuration file or via user input may provide the advantage of local administration of policies best suited to the local network configuration. Receiving the network communication management policy from the network communication pattern database may provide for central administration of policies and uniform application among multiple sites.

FIG. 5 provides examples of network communication management policies that may be associated with various source computer programs. As illustrated in this figure, pattern record 502 may include a destination hostname of liveupdate.symantec.com, which may indicate that the network node is running security software maintained by SYMANTEC LIVEUPDATE. As shown, the associated network communication management policy is Terminate Security Analysis, which may improve network performance by eliminating duplication of security functions already performed on the network node.

As shown, pattern record 504 includes a range of transmission control protocol/user datagram protocol (TCP/UDP) ports associated with a BITTORRENT client/server. The associated network communication management policy, Filter Program Traffic, may be applied to enforce a policy banning software used for peer-to-peer file sharing.

In another example, pattern record 506 includes several destination hostnames associated with a computer virus. The associated network communication management policy, Disable Network Access, may be applied to prevent spread of the virus until it is removed from the network node. In another example, pattern record 508 includes TCP port number 135, which may be used to implement remote procedure call services, and also in the spreading mechanism of botnets. The associated network communication management policy, Initiate Security Analysis, may subject network communication originating from the network node to greater scrutiny to determine whether the network communication serves a legitimate purpose or is associated with malware.

In another example, pattern record 510 includes a destination network address that may be associated with a distributed denial of service (DDos) attack. The associated network communication management policy, Initiate Security Analysis, may determine whether the network node is participating in such an attack. This example illustrates an advantage that may be realized by including the network communication management policy as a field in the network communication pattern database. DDoS attacks may arise quickly and include a large number of network nodes. As such attacks occur, the associated network communication patterns may be identified, records added to the network communication pattern database to enable identification of the network communication pattern, and an appropriate network communication management policy prescribed.

In some examples, the systems described herein may apply a network communication management policy to network communication associated with the computer program generating the pattern of network communication identified by identification module 104. In other examples, the systems described herein may apply a network communication management policy to all network communication between the network node running the computer program and network services. For example, if policy application module 110 determines that a pattern of network communication generated by network node 214 is indicative of or associated with security software running on network node 214, then policy application module 110 may apply a network communication management policy that terminates security analysis on computing device 202 of network traffic associated with network node 214. In this example, network performance may be improved by not duplicating security analysis on computing device 202 that may already be performed by the security software installed on network node 214. Conversely, if policy application module 110 determines that a pattern of network communication generated by network node 214 is indicative of or associated with a suspected computer virus or other malware, then policy application module 110 may apply a network communication management policy that initiates a security analysis or disables network access for network node 214.

In another example, if policy application module 110 determines that a pattern of network communication generated by network node 214 is indicative of or associated with parental control software installed on network node 214, then policy application module 110 may apply a policy to computing device 202 that terminates website filtering of network traffic associated with network node 214. As with the security analysis example above, improved network performance may be achieved by not duplicating services on computing device 202 that are already being performed on network node 214.

In other examples, policy application module 110 may apply a policy that filters network communication between network node 214 and a network service and/or filters network communication associated with a detected computer program installed on network node 214. Such policies may be appropriate when a computer program on network node 214 is attempting to communicate with a banned service, such as a malware-infected website, or when a computer program is attempting a banned communication, such as peer-to-peer file sharing.

As explained above, the systems and methods described herein may apply network communication management policies appropriate to the computer programs running on each network node communicating through a gateway or other network device. In this way, network security or other services may be applied without duplicating services already present on a network node. As a result of applying only the network services appropriate for the computer programs running on each network node, less expensive network devices may be able to more closely match the performance of more expensive devices while providing similar levels of security and utility. Additionally, the systems and methods described herein may operate within the practical constraints of not requiring a mechanism for communicating with end users.

Figure 6:
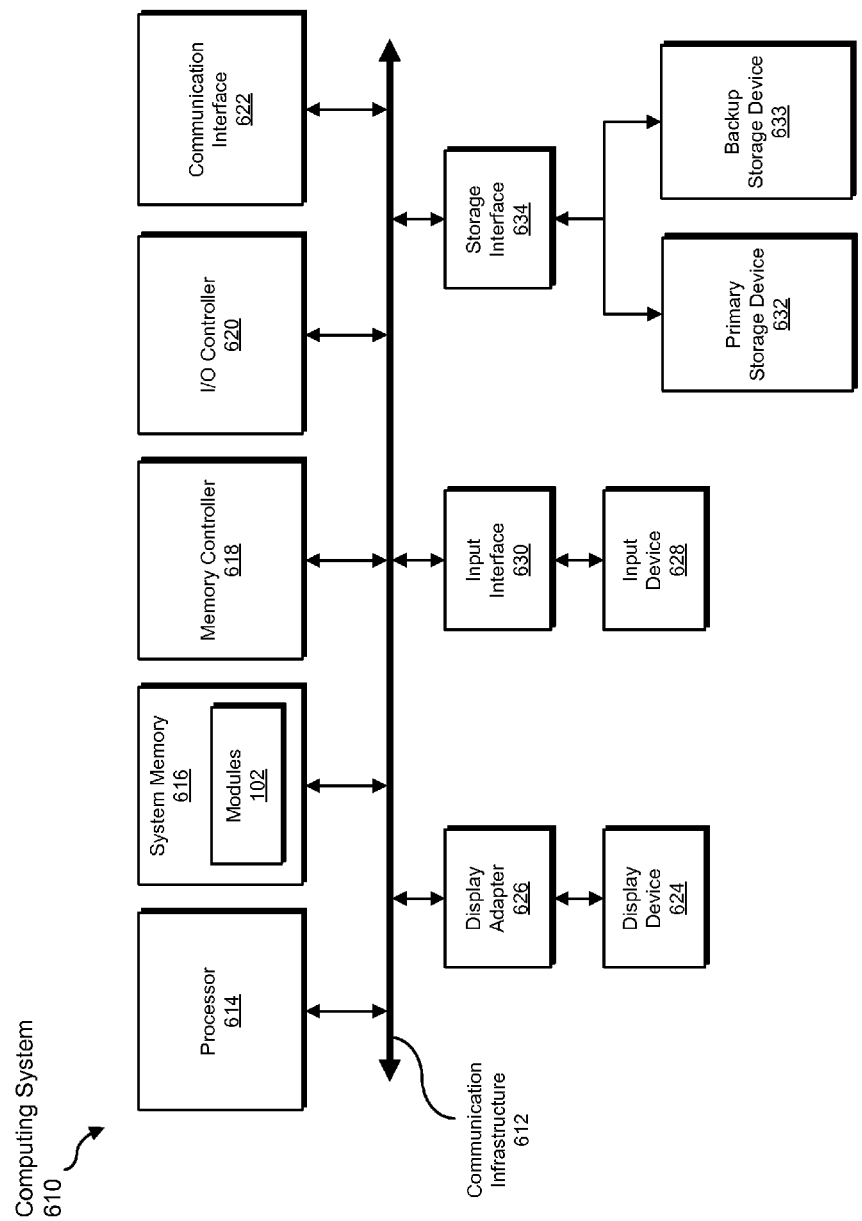
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
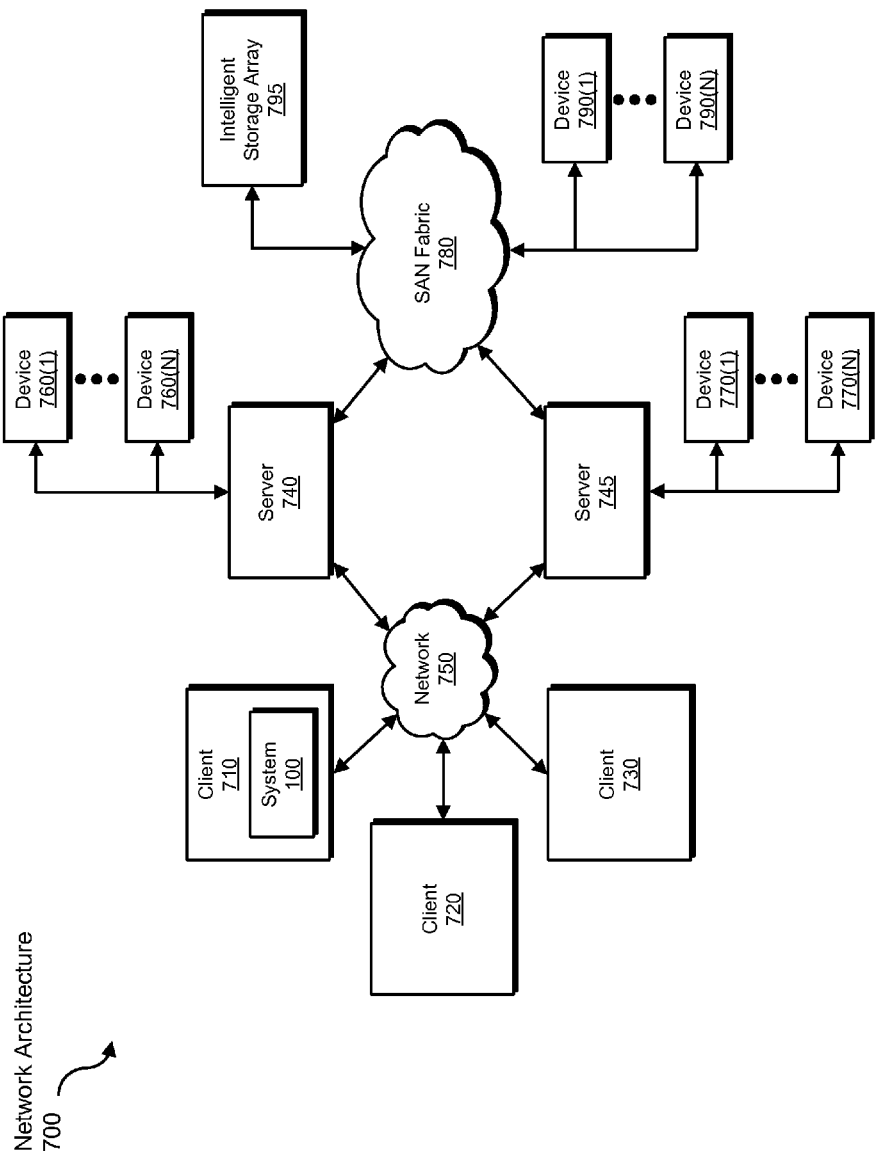
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for managing network communication.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for providing network communication management services. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing network communication, at least a portion of the method being performed by a computing device comprising at least one processor, the method comprising:

identifying, by a network gateway, a pattern of network communication between a network node and at least one network service, the pattern including a destination hostname that identifies a security vendor and the destination hostname indicating that the network node is running a security computer program provided by the security vendor;

creating a representation of the network communication pattern;

querying, using the representation of the network communication pattern, a network communication pattern database that associates network communication patterns with computer programs responsible for generating the network communication patterns;

receiving, in response to querying the network communication pattern database, identification of the security computer program that is associated with the network communication pattern and that is provided by the security vendor identified by the destination hostname; and applying, by the network gateway, a network communication management policy assigned to the security computer program associated with the network communication pattern by terminating performance of a security function on the network gateway that is already being performed on the network node to prevent duplicating the security function on the network gateway.

2. The method of claim 1, wherein identifying the pattern of network communication comprises at least one of:
    identifying a destination network address for the network service that the network node communicates with; and
    parsing a uniform resource identifier for the network service that the network node communicates with.

3. The method of claim 1, wherein the representation of the network communication pattern identifies at least one of:
    a destination network address for the network service that the network node communicates with;
    a uniform resource identifier for the network service that the network node communicates with;
    a uniform resource identifier scheme name for the network service that the network node communicates with;
    a destination hostname for the network service that the network node communicates with;
    a port number for the network service that the network node communicates with;
    a uniform resource identifier query sent by the network node to the network service; and
    a uniform resource identifier fragment sent by the network node to the network service.

4. The method of claim 1, wherein applying the network communication management policy comprises at least one of:
    terminating a security analysis of network traffic associated with the network node;
    terminating website filtering of network traffic associated with the network node;
    terminating filtering of network communication between the network node and at least one network service; and
    terminating filtering of network communication associated with the security computer program that is associated with the network communication pattern.

5. The method of claim 1, further comprising obtaining the network communication management policy by at least one of:

reading the network communication management policy from a configuration file;
obtaining the network communication management policy from the network communication pattern database; and
receiving, via a user interface, a user-generated selection of the network communication management policy.

6. The method of claim 1, wherein the computing device comprises at least one of:
a router;
a routing switch;
an integrated access device; and
a cache server.

7. The method of claim 1, further comprising maintaining the network communication pattern database.

8. The method of claim 7, wherein maintaining the network communication pattern database comprises:
installing the security computer program;
monitoring network traffic originating from the security computer program; and
adding the network communication pattern associated with the security computer program to the network communication pattern database.

9. The method of claim 7, wherein maintaining the network communication pattern database comprises:
deploying a software agent that locates, downloads, and installs the security computer program;
monitoring network traffic originating from the security computer program; and
adding the network communication pattern associated with the security computer program to the network communication pattern database.

10. The method of claim 7, wherein maintaining the network communication pattern database comprises:
providing a monitoring module to network nodes that monitors traffic originating from the security computer program;
receiving, from the monitoring module, the network communication pattern associated with the security computer program; and
adding the network communication pattern associated with the security computer program to the network communication pattern database.

11. A system for managing network communication, the system comprising:
an identification module that, as part of a network gateway, identifies a pattern of network communication between a network node and at least one network service, the pattern including a destination hostname that identifies a security vendor and the destination hostname indicating that the network node is running a security computer program provided by the security vendor;
a pattern representation module that creates a representation of the network communication pattern;
a query module that:
queries, using the representation of the network communication pattern, a network communication pattern database that associates network communication patterns with computer programs responsible for generating the network communication patterns;
receives, in response to querying the network communication pattern database, identification of the security computer program that is associated with the network communication pattern and that is provided by the security vendor identified by the destination hostname;
policy application module that, as part of the network gateway, applies a network communication management policy assigned to the security computer program associated with the network communication pattern by terminating performance of a security function on the network gateway that is already being performed on the network node to prevent duplicating the security function on the network gateway;
at least one processor configured to execute the identification module, the pattern representation module, the query module, and the policy application module.

12. The system of claim 11, wherein the identification module identifies the pattern of network communication by at least one of:
identifying a destination network address for the network service that the network node communicates with; and
parsing a uniform resource identifier for the network service that the network node communicates with.

13. The system of claim 11, wherein the representation of the network communication pattern identifies at least one of:
a destination network address for the network service that the network node communicates with;
a uniform resource identifier for the network service that the network node communicates with;
a uniform resource identifier scheme name for the network service that the network node communicates with;
a destination hostname for the network service that the network node communicates with;
a port number for the network service that the network node communicates with;
a uniform resource identifier query sent by the network node to the network service; and
a uniform resource identifier fragment sent by the network node to the network service.

14. The system of claim 11, wherein the policy application module applies the network communication management policy by at least one of:
terminating a security analysis of network traffic associated with the network node;
terminating website filtering of network traffic associated with the network node;
terminating filtering of network communication between the network node and at least one network service; and
terminating filtering of network communication associated with the security computer program that is associated with the network communication pattern.

15. The system of claim 11, further comprising a policy module that obtains the network communication management policy by at least one of:
reading the network communication management policy from a configuration file;
obtaining the network communication management policy from the network communication pattern database; and
receiving, via a user interface, a user-generated selection of the network communication management policy.

16. The system of claim 11, wherein the system comprises at least one of:
a router;
a routing switch;
an integrated access device; and
a cache server.

17. The system of claim 11, further comprising a database maintenance module that maintains the network communication pattern database.

18. The system of claim 17, wherein the database maintenance module maintains the network communication pattern database by:
- installing the security computer program;
- monitoring network traffic originating from the security computer program; and
- adding the network communication pattern associated with the security computer program to the network communication pattern database.

19. The system of claim 17, wherein the database maintenance module maintains the network communication pattern database by:
- deploying a software agent that locates, downloads, and installs the security computer program;
- monitoring network traffic originating from the security computer program; and
- adding the network communication pattern associated with the security computer program to the network communication pattern database.

20. A non-transitory computer-readable medium comprising one or more computer-executable instructions that, when executed by at least one processor of a network gateway, cause the network gateway to:
- identify a pattern of network communication between a network node and at least one network service, the pattern including a destination hostname that identifies a security vendor and the destination hostname indicating that the network node is running a security computer program provided by the security vendor;
- create a representation of the network communication pattern;
- query, using the representation of the network communication pattern, a network communication pattern database that associates network communication patterns with computer programs responsible for generating the network communication patterns;
- receive, in response to querying the network communication pattern database, identification of the security computer program that is associated with the network communication pattern and that is provided by the security vendor identified by the destination hostname; and
- apply a network communication management policy assigned to the security computer program associated with the network communication pattern by terminating performance of a security function on the network gateway that is already being performed on the network node to prevent duplicating the security function on the network gateway.

* * * * *